(12) United States Patent
Adams et al.

(10) Patent No.: US 11,684,024 B2
(45) Date of Patent: Jun. 27, 2023

(54) PLANT GROWING SYSTEM

(71) Applicant: Evogro LTD, East Malling (GB)

(72) Inventors: Paul Adams, East Malling (GB); Jason Hirst, East Malling (GB)

(73) Assignee: EVOGRO LTD, Kent (GB)

( * ) Notice: Subject to any disclaimer, the term of this patent is extended or adjusted under 35 U.S.C. 154(b) by 426 days.

(21) Appl. No.: 16/496,216

(22) PCT Filed: Mar. 22, 2018

(86) PCT No.: PCT/EP2018/057374
§ 371 (c)(1),
(2) Date: Sep. 20, 2019

(87) PCT Pub. No.: WO2018/172490
PCT Pub. Date: Sep. 27, 2018

(65) Prior Publication Data
US 2020/0022318 A1   Jan. 23, 2020

(30) Foreign Application Priority Data

Mar. 22, 2017 (GB) ..................... 1704543

(51) Int. Cl.
*A01G 9/24* (2006.01)
*A01G 9/18* (2006.01)
*A01G 9/26* (2006.01)
*G05B 15/02* (2006.01)

(52) U.S. Cl.
CPC ............ *A01G 9/246* (2013.01); *A01G 9/18* (2013.01); *A01G 9/247* (2013.01); *A01G 9/26* (2013.01); *G05B 15/02* (2013.01)

(58) Field of Classification Search
CPC .......... A01G 9/246; A01G 9/18; A01G 9/247; A01G 9/26; A01G 9/24; A01G 31/06; G05B 15/02; Y02A 40/25
USPC ........................................................... 47/1.3
See application file for complete search history.

(56) References Cited

U.S. PATENT DOCUMENTS

| | | | |
|---|---|---|---|
| 4,858,377 A * | 8/1989 | Oglevee | A01G 9/247 47/17 |
| 4,916,642 A * | 4/1990 | Kaiser | G05D 23/1905 700/278 |
| 2014/0115958 A1* | 5/2014 | Helene | A01G 31/06 47/17 |

(Continued)

*Primary Examiner* — Timothy D Collins
*Assistant Examiner* — Maria E Graber
(74) *Attorney, Agent, or Firm* — Invention To Patent Services; Alex Hobson (57) ABSTRACT

Disclosed is a plant growing system (100), comprising: a plurality of plant growing zones (122); a control apparatus (120) configured to control one or more environmental conditions in each of the plurality of plant growing zones (122); and a receiver (142) configured to receive input data indicating plant type characteristics of a plurality of plant characteristics types to be grown in a plant growing apparatus (120). Also disclosed is a plant growing apparatus (120) configured to grow a plurality of plant types, a method to control a plant growing apparatus (120) configured to grow a plurality of plant types, and a computer program including computer-readable instructions executable to perform a method to control a plant growing apparatus (120) configured to grow a plurality of plant types.

20 Claims, 7 Drawing Sheets

(56) References Cited

U.S. PATENT DOCUMENTS

| | | | |
|---|---|---|---|
| 2016/0000021 A1* | 1/2016 | Sugimoto | A01C 21/00 47/66.6 |
| 2016/0138075 A1* | 5/2016 | Elder | G01N 27/3273 435/25 |
| 2019/0323253 A1* | 10/2019 | Benvie | A01G 9/247 |

* cited by examiner

| Plant type A | Germination phase | Seedling phase | Growth phase | Harvest phase |
|---|---|---|---|---|
| No of days | 1 | 1 | 1 | 1-2 |
| Irrigation level | None | 1x | 2x | 2x |
| Light level | None | Low | Low | High |

| Plant type B | Germination phase | Seedling phase | Growth phase | Harvest phase |
|---|---|---|---|---|
| No of days | 1 | 1 | 1 | 1-2 |
| Irrigation level | None | 1x | 1x | 2x |
| Light level | None | Low | Low | High |

Figure 5a

| Plant type C | Germination phase | Seedling phase | Growth phase | Harvest phase |
|---|---|---|---|---|
| No of days | 1 | 1 | 1 | 1-3 |
| Irrigation level | 1x | 1x | 2x | 2x |
| Light level | Low | Low | Low | High |

| Plant type D | Germination phase | Seedling phase | Growth phase | Harvest phase |
|---|---|---|---|---|
| No of days | 1 | 1 | 1 | 1-3 |
| Irrigation level | 1x | 1x | 1x | 2x |
| Light level | Low | Low | Low | High |

PLANT GROWING SYSTEM

FIELD OF THE INVENTION

The present invention relates to a plant growing system, apparatus, method and computer program.

BACKGROUND TO THE INVENTION

Apparatus for growing plants typically include multiple growing zones, such as shelves, into which the plants to be grown or planted seeds are placed. In some examples, the different growing zones have independently controllable environmental conditions. However, such apparatuses suffer from constraints relating to space, with the number of plant types that can be grown simultaneously being limited by the number of plant growing zones.

SUMMARY OF THE INVENTION

According to a first aspect of the invention there is provided a plant growing system comprising a plurality of plant growing zones; a control system configured to control one or more environmental conditions in each of the plurality of plant growing zones; and a receiver configured to receive input data indicating plant type characteristics of a plurality of plant types to be grown in the plant growing apparatus, wherein the control system is arranged to: perform a first determination to determine, for a first time period, a first set of environmental conditions for a first subset of the plurality of plant types and a second set of environmental conditions for a second subset of the plurality of plant types; control a first plant growing zone of the plurality of plant growing zones according to the first set of environmental conditions during the first time period; control a second plant growing zone of the plurality of plant growing zones according to the second set of environmental conditions during the first time period; perform a second determination to determine, for a second time period, a third set of environmental conditions for a third subset of the plurality of plant types and a fourth set of environmental conditions for a fourth subset of the plurality of plant types; control the first plant growing zone according to the third set of environmental conditions during the second time period; and control the second plant growing zone according to the fourth set of environmental conditions during the second time period.

According to a second aspect of the invention, there is provided a plant growing apparatus configured to grow a plurality of plant types, the plant growing apparatus comprising: a plurality of plant growing zones; a control apparatus configured to control one or more environmental conditions in each of the plurality of plant growing zones; and a communication interface configured to receive data indicating instructions to be carried out by the control apparatus, the instruction specifying, for a first time period, a first and second set of environmental conditions for respective first and second subsets of the plurality of plant types, and for a second time period, a third and fourth set of environmental conditions for respective third and fourth subsets of the plurality of plant types, wherein the control apparatus is configured to: control a first plant growing zone of the plurality plant growing zones according to the first set of environmental conditions during the first time period; control a second plant growing zone of the plurality of plant growing zones according to the second set of environmental conditions during the first time period; control the first plant growing zone of the plurality plant growing zones according to the third set of environmental conditions during the second time period; control the second plant growing zone of the plurality of plant growing zones according to the fourth set of environmental conditions during the second time period.

According to a third aspect of the invention, there is provided a method to control a plant growing apparatus configured to grow a plurality of plant types, the plant growing apparatus comprising a plurality of plant growing zones, the method comprising: receiving input data indicating characteristics of a plurality of plant types to be grown in the plant growing apparatus; determining, for a first time period, a first set of environmental conditions for a first subset of the plurality of plant types and a second set of environmental conditions for a second subset of the plurality of plant types; controlling a first plant growing zone of the plurality of plant growing zones according to the first set of environmental conditions during the first time period; controlling a second plant growing zone of the plurality of plant growing zones according to the second set of environmental conditions during the first time period; determining, for a second time period, a third set of environmental conditions for a third subset of the plurality of plant types and a fourth set of environmental conditions for a fourth subset of the plurality of plant types; controlling the first plant growing zone according to the third set of environmental conditions during the second time period; and controlling the second plant growing zone according to the fourth set of environmental conditions during the second time period.

According to a fourth aspect of the invention, there is provided a computer program including computer-readable instructions executable to perform a method comprising: receiving input data indicating characteristics of a plurality of plant types to be grown in the plant growing apparatus; generating a growth plan indicating, for a first time period, a first and second set of environmental conditions for respective first and second subsets of the plurality of plant types, and for a second time period, a third and fourth set of environmental conditions for respective third and fourth subsets of the plurality of plant types; and transmitting data according to the growth plan to the plant growing apparatus, the transmitted data comprising instructions for the plant growing apparatus to: control a first plant growing zone of the plurality plant growing zones according to the first set of environmental conditions during the first time period; control a second plant growing zone of the plurality of plant growing zones according to the second set of environmental conditions during the first time period; control the first plant growing zone of the plurality plant growing zones according to the third set of environmental conditions during the second time period; and control the second plant growing zone of the plurality of plant growing zones according to the fourth set of environmental conditions during the second time period.

DETAILED DESCRIPTION

In the following description, for purposes of explanation, numerous specific details of certain examples are set forth. Reference in the specification to "an example" or similar language means that a particular feature, structure, or characteristic described in connection with the example is included in that one example, but not necessarily in other examples.

Figure 1:
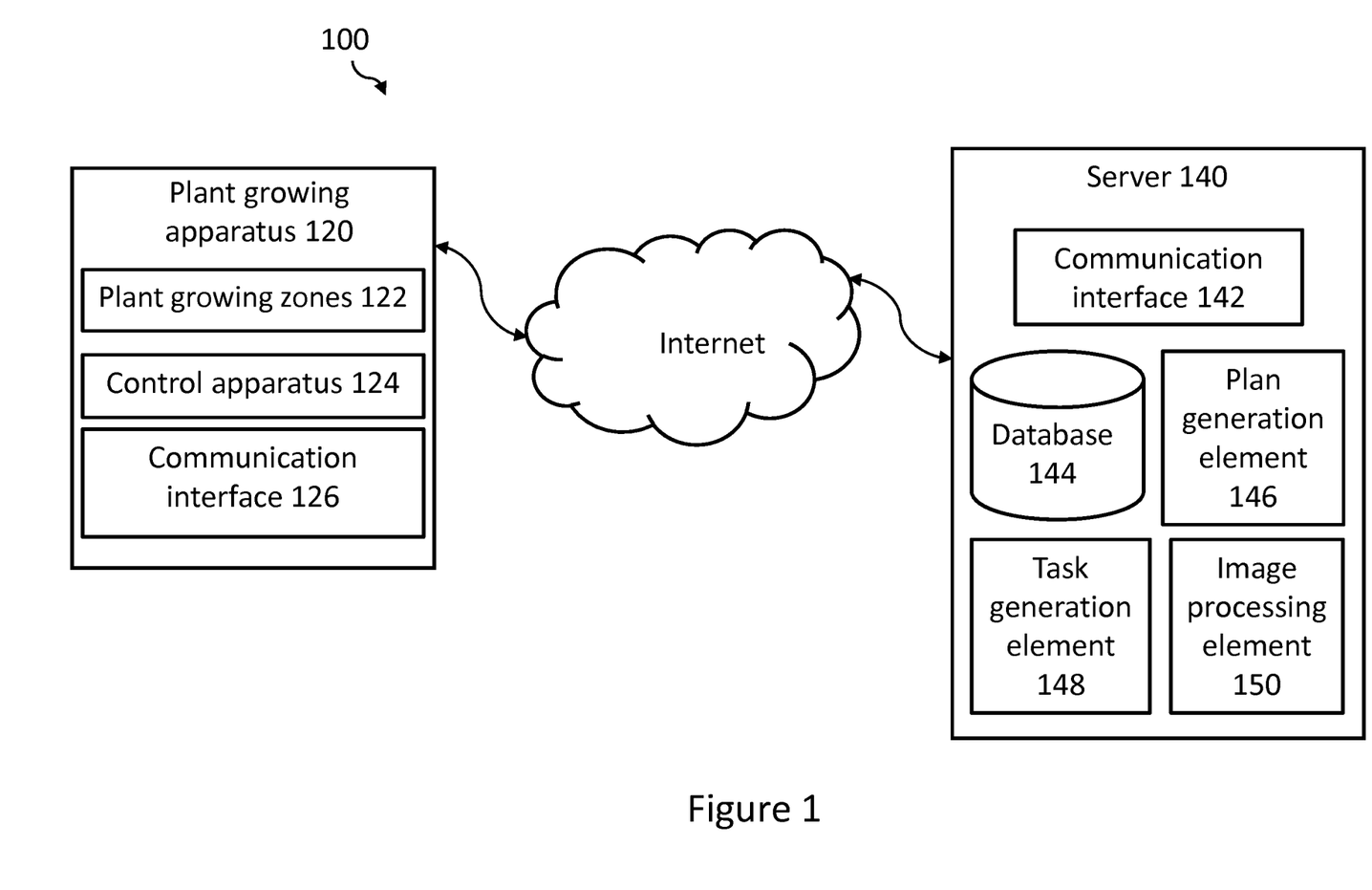
FIG. 1 is a schematic diagram of a plant growing system according to an example.

FIG. 1 schematically illustrates an example of a plant growing system 100. The plant growing system 100 may comprise a plant growing apparatus 120 comprising a plurality of plant growing zones 122. The plant growing apparatus 120 may also comprise a control apparatus 124 and a communication interface 126. The control apparatus 124 may be configured to control one or more environmental conditions in each of the plurality of plant growing zones 122. The communication interface 126 may be configured to receive data indicating instructions to be carried out by the control apparatus 124. In some examples, the plant growing apparatus 120 may be provided in the form of a plant growing appliance 120 (hereinafter "appliance 120") to a user in order for the user to grow a plurality of types of plant. The plant growing apparatus 120 may be a unitary device, i.e. may comprise a single enclosure including each of the plurality of plant growing zones 122. In other examples, the plant growing apparatus 120 may be a distributed apparatus in which the plant growing zones 122 are located in a plurality of different locations in different respective enclosures.

The plant growing system 100 may comprise a server 140 comprising a communication interface 142. The communication interface 142 may function as a receiver to receive input data indicating plant type characteristics of a plurality of plant types to be grown in the appliance 120. The server 140 may comprise a database 144 arranged to store data associating plant type characteristics with corresponding environmental characteristics for growing the respective plant types. The server 140 may also comprise a plan generation element 146 which is arranged to generate a growth plan for growing the plurality of plant types indicated by the input data in the appliance 120. The server 140 may also comprise a task generation element 148 for specifying tasks to be performed by the user in relation to the appliance 120, and an image processing element 150 for processing images of plants growing in the appliance 120. The functions of these, as well as other components that may be comprised in both the appliance 120 and the server 140 are described in more detail with reference to specific examples further below.

The respective communication interfaces 126 and 142 of the appliance 120 and the server 140 respectively may communicate with each other through the internet for example.

The plant growing system 100 may be accessible through a user interface. The user interface may allow users to view and input information relating to the plant growing system 100, as well as to control aspects of the plant growing system 100. The user interface may provide a user with desired harvesting schedule input options, a tasks view indicating tasks to be performed in relation to the appliance 120, a plant status view indicating the status of plants growing in the appliance 120, and user profile management options in order for the user to manage their profile information. The user interface may be provided through any means of providing an interactive user interface such as, for example, an application running on a personal computer, an application running on mobile devices such as a smartphone or tablet computer, or a plugin for a web browser. In some examples, the user interface may be accessed through the internet by, for example, the user navigating to a particular web address. In some examples, the user interface may be provided through an interactive user interface component included in the appliance 120 such as, for example, a key pad and display panel, or a touch screen.

Figure 2:
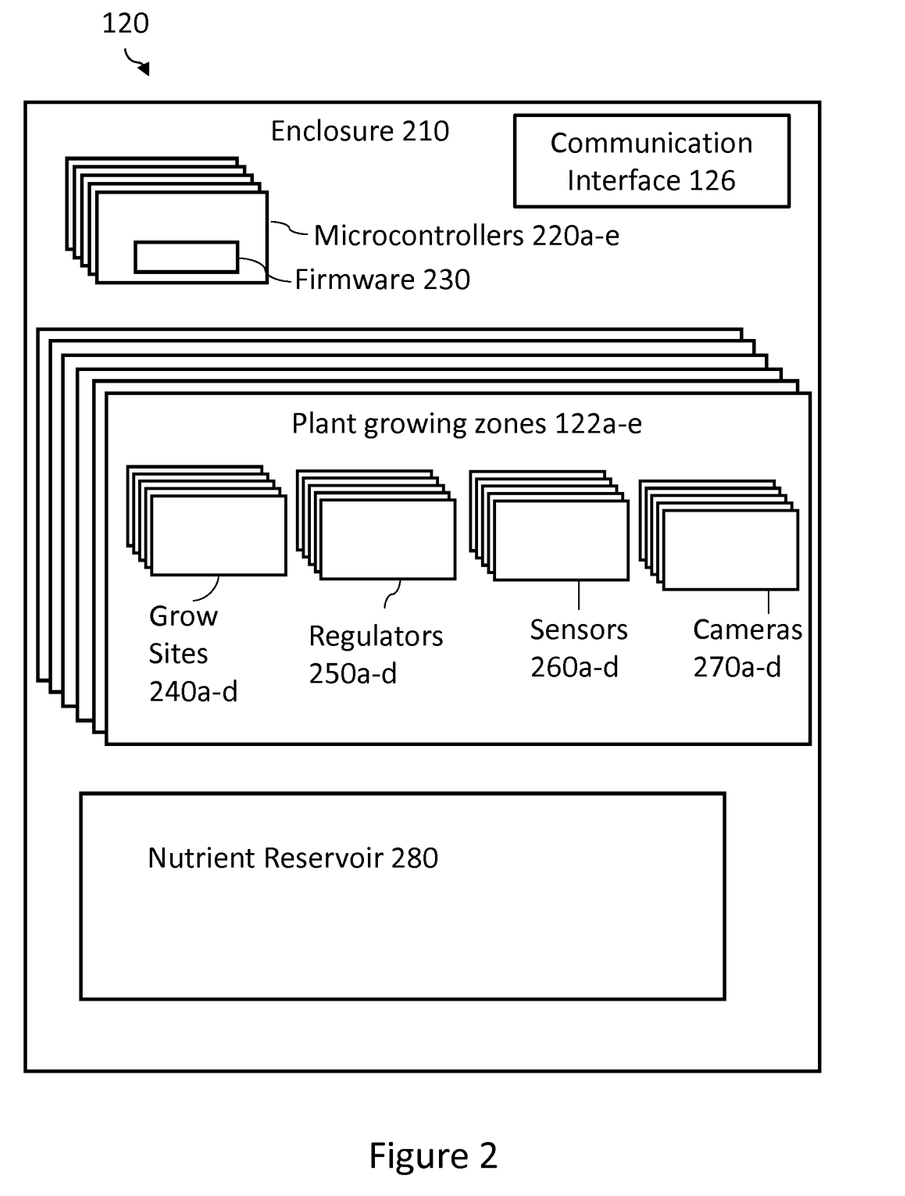
FIG. 2 is a schematic diagram of a plant growing apparatus according to an example.

More specific examples will now be described. FIG. 2 is a schematic illustration of an example appliance 120. The appliance 120 may comprise an enclosure 210. The appliance 120 may also comprise one or more microcontrollers 220a-e for executing instructions specified by software such as firmware 230. Each of the plurality of plant growing zones 122a-e may comprise one or more grow sites 240a-d at which individual units of plants can be grown, one or more regulators 250a-d, one or more sensors 260a-d and one or more cameras 270a-d. Although certain numbers of different components of the appliance 120 are illustrated in FIG. 2, any suitable number of each of the components may be comprised in the appliance 120. For example, in addition to a first 260a, second 260b, third 260c and fourth 260d sensor, each plant growing zone 122a-e may comprise a fifth sensor 260e and a sixth sensor 260f, and so on.

The appliance may also comprise a nutrient reservoir 280. In some examples, each plant growing zone may be connected to a separate nutrient reservoir. The microcontrollers 220, sets of regulators 250, sensors 260 and cameras 270 of each plant growing zone may form part of the control apparatus 124.

The enclosure 210 may be in the form of a cabinet. The enclosure 210 may comprise a plurality of shelves, each shelf comprising one or more of the plant growing zones 122. In one example, each shelf comprises a single plant growing zone. Each plant growing zone may have a given height defining the vertical space available to plants growing within that plant growing zone.

Each of the grow sites 240 may be a site at which a pot or punnet containing a plant growth medium and one or more units of plant may be placed. A unit of plant contained in a pot, for example, may be moved manually from one plant growing zone to another.

The regulators 250 of the control apparatus 124 may be configured to regulate (control) given environmental conditions within each of the plant growing zones 122 independently. For example, a first regulator 250a may comprise a set of light emitting diodes (LEDs) which regulate the characteristics of electromagnetic radiation within their respective plant growing zone. Characteristics of electromagnetic radiation may include intensity and wavelength. For example, a set of LEDs 250a in a given plant growing zone may provide light of a visible wavelength, infra-red light, ultraviolet light or any combination thereof of various intensities. Other examples of regulators 250 are pumps that supply nutrients to plants growing in the plant growing zones 122 from the nutrient reservoir 280 using common hydroponic irrigation methods, actuators for adjusting nutrient levels in the nutrient reservoir 280, carbon dioxide regulators, humidity regulators, temperature regulators, airflow regulators, moisture regulators to regulate a moisture level of a plant growth medium, pH regulators to regulate a pH level of a growth medium and actuators that control the height of respective plant growing zones. In some examples, one or more of the environmental conditions within a plant growing zone may be fixed, for example, the plant growing zones 122 may be of various fixed heights.

The one or more sensors 260 may be environmental condition sensors to detect given environmental conditions within each of the plant growing zones 122. For example, the sensors 260 may include temperature sensors, humidity sensors, carbon dioxide sensors, growth medium pH sensors, sensors for monitoring nutrient levels in the nutrient reservoir 280 and growth medium moisture sensors.

The communication interface 126 may receive data from the server 140 indicating instructions specifying desired sets of environmental conditions for respective given plant growing zones for respective given periods of time. The received instructions may provide information required by the firmware 230 to cause the microcontrollers 220 to control the regulators 250 based on the environmental conditions detected by the sensors 260 in the given plant growing zones to achieve respective desired sets of environmental conditions within the given plant growing zones for respective given periods of time.

The cameras 270 may capture image data of plants growing in the plant growing zones 122, and the communication interface 126 may transmit the captured images to the server 140. The communication interface 142 of the server 140 may receive the captured image data, and the image processing element 150 may perform image processing on the received image data to determine a condition of the plants to which the image data relates.

Methods performed by the plant growing system 100 will now be described. A user wishing to grow a plurality of types of plant in the appliance 120 may input data indicating plant type characteristics of the plurality of plant types using the desired harvesting schedule input options provided in the user interface. The characteristics of the plurality of plant types may comprise a desired harvesting schedule indicating the total yield of the plurality of plant types desired by the user, and the yield on given days of each plant type desired by the user. For example, the user may wish to obtain 2 units of plant A on Saturday, and 3 units of plant B on Sunday. This means a total desired yield of 5 units of plants. The user may also indicate a priority weight, in other words a relative importance value, of each desired plant. For example, the user may wish for plant type A to be given priority over plant type B and may indicate this by giving plant type A a relative importance of a higher numerical value than the relative importance of plant type B.

Figure 3:
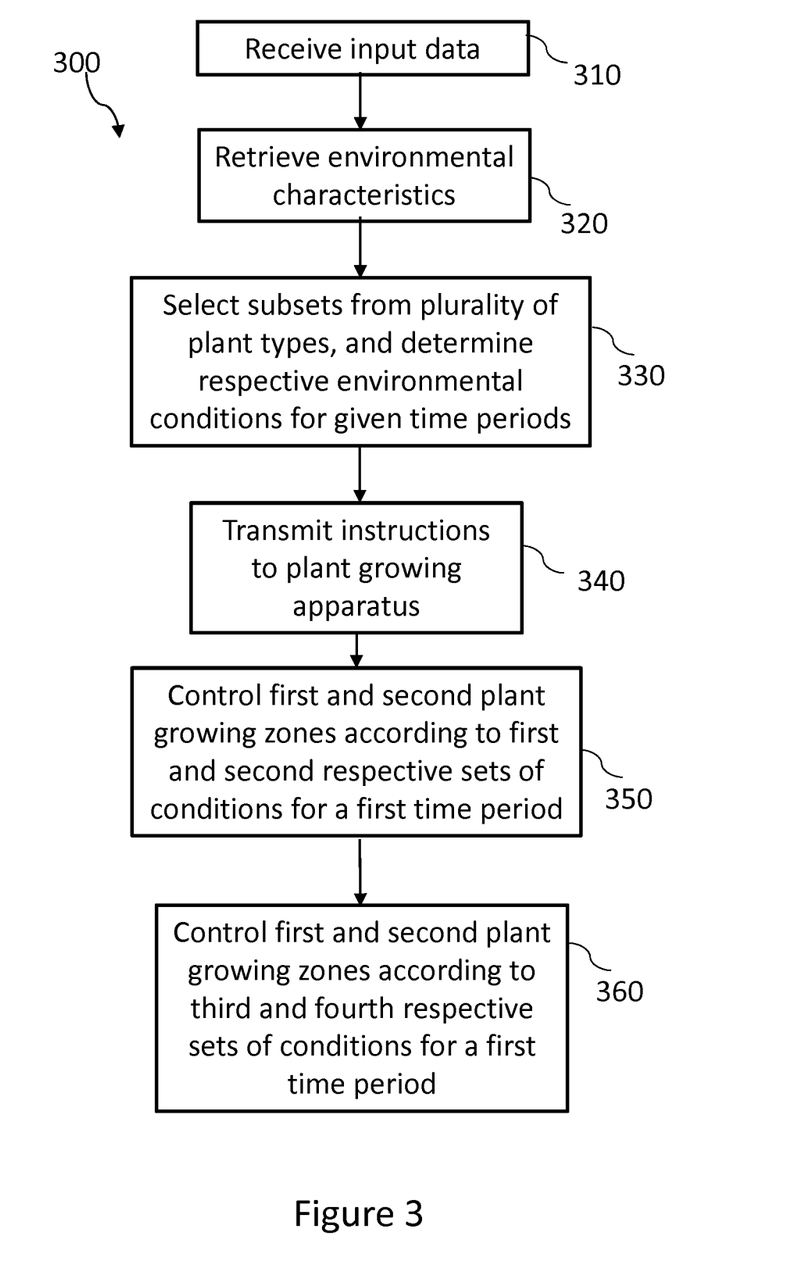
FIG. 3 is a flow diagram of a first example method performed by the plant growing system.

Referring now to FIG. 3, at step 310 of the method 300 performed by the plant growing system 100, the communication interface 142 receives input data indicating plant type characteristics of a plurality of plant types to be grown in the appliance 120. At step 320, the plan generation element 146 accesses the database 144 to retrieve environmental characteristics corresponding to the plurality of plant types. Then, at step 330, the plan generation element 146 selects subsets from the plurality of plant types based at least in part on the input data. The selection of subsets is explained in detail below.

The plants to be grown in the appliance 120 may be referred to as having different development phases. Each type of plant to be grown in the appliance 120 may, for example, have a germination phase, a seedling phase, a growth phase and a harvesting phase. The amount of time a development phase lasts for a given type of plant may be the same or different to the amount of time that development phase lasts for a different type of plant. Each type of plant may require a given set of environmental conditions at a given development phase in order to experience healthy growth. Different types of plant may require the same or a different set of environmental conditions at a given development phase. Different types of plant may also require the same set of environmental conditions, for example, at respective different phases of their development.

For example, plant type A and plant type B may both require a first set of environmental conditions for the germination phase. However, plant type A may require a second set of environmental conditions for its seedling phase, whereas plant type B may require that second set of environmental conditions for its growth phase but not its seedling phase. It may therefore be possible to provide the same set of environmental conditions to different types of plant at respective different development phases. For example, if plant type A is in its seedling phase at the same time as plant type B is in its growth phase, a given plant growing zone of the appliance 120 may be controlled according to, in other words to provide, the second set of environmental conditions required by both plant types, and both plant types may be placed in that plant growing zone. Thus, it may be possible to grow both plant types in the same environment for a period of time for which the seedling phase of plant type A and for which the growth phase of plant type B lasts.

At step 330, subsets of the plant types are selected according to the environmental conditions the different types of plant require for given periods of time. Each subset may be selected such that each type of plant within that subset requires the same set of environmental conditions for the same period of time. Periods of time may therefore be defined as amounts of time a given subset requires a given set of environmental conditions.

Along with the selection of the subsets for a given period of time, at step 330, sets of environmental conditions for respective subsets for the given period of time are determined since the selection of subsets is related to the environmental conditions the subsets require for the given period of time. The determinations of environmental conditions are performed on the basis of the environmental characteristics retrieved from the database 144 at step 330. In one example, a first subset of the plant types may be selected, and the plan generation element 146 may determine, for a first time period, a first set of environmental conditions for the first subset. Also, a second subset of the plant types may be selected, and the plan generation element 146 may determine, for a first time period, a second set of environmental conditions for the second subset. For a second time period, a third and a fourth subset of the plant types may be selected, and the plan generation element 146 may determine respective third and fourth sets of environmental conditions. It will be appreciated that any suitable number of subsets may be selected and corresponding sets of environmental conditions determined for each period of time, and this may be done for any suitable number of periods of time. For example, selection of subsets and determination of corresponding sets of conditions may be done for a number and duration of periods of time so as to encompass the time from when plants are introduced to the plant growing appliance until they are harvested.

As explained above, the selection of the subsets may be based at least in part on the input data. For example, the selection of the subsets may be based on the desired harvesting schedule indicated by a user. The desired harvesting schedule may, for example, specify that units of plant types A and B are required on Wednesday, whereas units of plant types C and D are required on Saturday. Thus, for a time period on a day that is too early for plant types C and D to have been introduced to the appliance 120 (given the day on which they are expected to be harvested is much later), subsets for that time period may only include plant types A and B. Selected subsets may also be based on the total desired yield indicated by the input data in that they may include a number of units of each type of plant according to the total desired yield.

At step 340, the communication interface 142 transmits instruction to the appliance 120 to be carried out by the control apparatus 124. The instructions may specify the first and second sets of environmental conditions for respective first and second subsets for the first time period, and the third and fourth sets of environmental conditions for respective third and fourth subsets for a second time period.

The communication interface 126 may then receive the instructions transmitted at step 340, and at step 350, the control apparatus 124 controls a first plant growing zone 122a according to the first set of conditions and a second plant growing zone 122b according to the second set of conditions for the first period of time. At step 360, the control apparatus 124 may control the first plant growing zone 122a according to the third set of conditions and the second plant growing zone 122b according to the fourth set of conditions for the second period of time.

It will be understood that the first subset of plant types is to be placed in the first plant growing zone 122a and the second subset in the second plant growing zone 122b for the first time period, and that the third and fourth subsets are to be placed respectively in the first and second plant growing zones 122a and 122b for the second time period. The user may be required to perform actions in order to ensure that the correct subset is placed in each of the plant growing zones for a given time period.

The plan generation element 146 may also implement one or more steps in order to generate a growth plan for plants to be grown in the appliance 120. The user may be presented with the proposed growth plan through the user interface after having input data using the desired harvesting schedule input options. If the user accepts the proposed growth plan, the server 140 may proceed to step 340 of method 300 in order to control the appliance 120. On the other hand, if the user does not accept the proposed growth plan, the user may, for example, be given the option to input new data indicating plant type characteristics of the plurality of plant types using the desired harvesting schedule input options provided in the user interface. The user may then be presented with a new proposed growth plan through the user interface after having input the new data, which the user can accept to proceed to step 340 of method 300.

Figure 4:
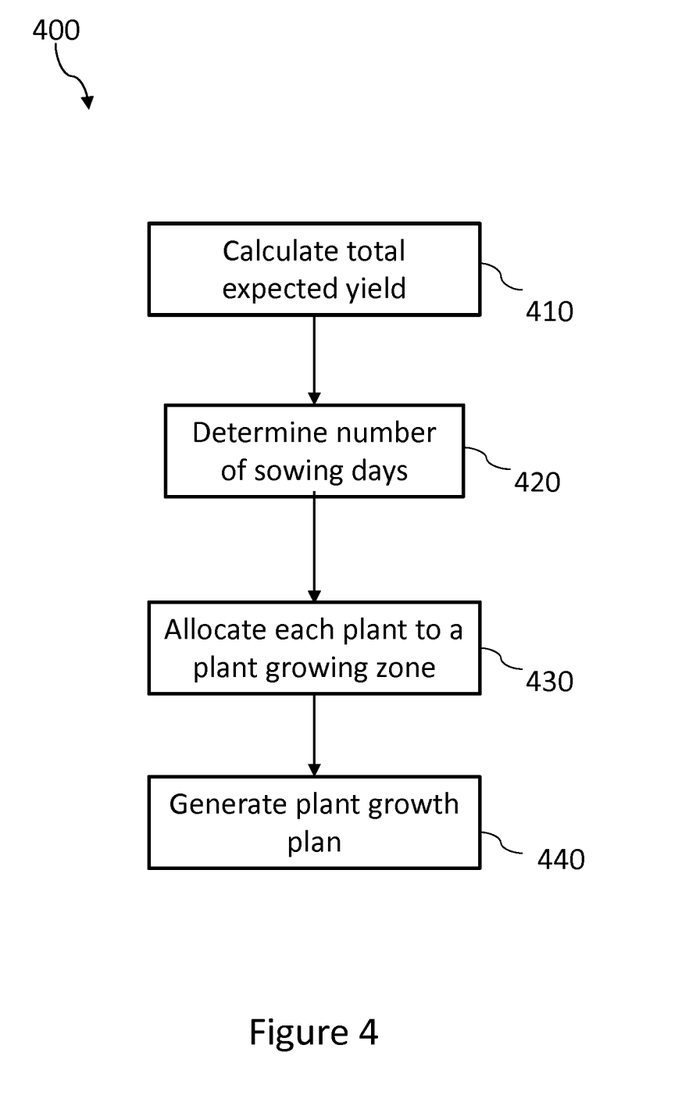
FIG. 4 is a flow diagram of a second example method performed by the plant growing system.

FIG. 4 illustrates a method 400 of generating a growth plan. The growth plan may identify a set of combinations of plant types and corresponding environmental conditions for respective time periods. The set of combinations identified by the growth plan may, for example, include the first, second, third and fourth subsets and sets of environmental conditions mentioned above in relation to method 300. The set of combinations may be selected on the basis of one or more desired characteristics of the growth plan.

The method 400 may be performed in a series of separate steps. In the example of method 400, a first desired characteristic is an expected yield of the plurality of plant types, a second desired characteristic is a number of time periods in which plants are to be introduced to the appliance 120, and a third desired characteristic is a number of times plants are to be moved between plant growing zones.

At step 410, a first set of combinations is selected on the basis of an expected yield. At this step, the plan generation element 146 calculates a total expected yield of the plurality of plants so as to reduce as much as practicable a shortfall in the total expected yield with respect to the total desired yield. The shortfall is reduced as much as practicable given, for example, the capacities of the plant growing system 100 and the desired yield of each plant type on given days. These capacities may include, for example, the total number of grow sites available in the appliance 120, the number of plant growing zones of a given height, the total number of plant growing zones available in the appliance 120 and/or any other capacity of the plant growing system 100 that may limit the total expected yield.

At step 410, the plan generation element 146 performs a calculation to reduce function (1) shown below so as to substantially minimize it:

$$\Sigma_{p \in Plants} w_p \Sigma_{d \in Days} Shortfall_{pd} \quad (1)$$

In function (1) above, p is a plant belonging to the set Plants which comprises all plants of all plant types indicated by the input data, and d is a day belonging to the set Days which comprises all days over which the growth plan is to be implemented. The parameter $w_p$ represents the relative importance value of the plant p, and $Shortfall_{pd}$ represents the shortfall of the expected yield of plant p on day d with respect to the desired yield of that plant on that day.

A determination as to when function (1) has been substantially minimized may be based on one or more of the limitations of the computer hardware, the software being used, time constraints and the like. The function (1) may be determined to be substantially minimized, for example, when a calculation to reduce its value has been performed for a threshold time duration and/or for a threshold number of iterations and/or until an error parameter related to the calculation is reduced below a threshold error value, for example. Hereinafter the term "minimized" is used with the meaning that a mathematical entity is reduced according to a given set of criteria. Minimizing function (1) may be equated to minimizing the total shortfall in the total expected yield with the respect to the total desired yield.

Minimizing function (1) at step 410 comprises selecting a first set of combinations such that the value of function (1) is minimized. During this calculation, a first set of constraints may be applied to the selection of the first set of combinations. An example of a constraint in a first set of constraints may, for example, be that the total number of individual plants requiring a given set of environmental conditions does not exceed the number of available grow sites of a plant growing zone being controlled according to that given set of environmental conditions on the day in question. Another example of a constraint comprised in the first set of constraints is that a plant requiring a given zone height for the development phase it is in is not placed in a zone of insufficient height. Any number of suitable constraints may be comprised in the first set of constraints. Referring again to method 300 of FIG. 3, it should be appreciated that such constraints may factor into subset selection and environmental condition determination at step 330 of method 300.

A result of step 410 is an expected yield of plants. If it is the case that the capacities of the plant growing system 100 can accommodate the desired harvesting schedule, the total expected yield may be the same as the total desired yield. However, if the plant growing system 100 cannot accommodate the desired harvesting schedule, there may be a shortfall in the expected yield with respect to the total desired yield.

The method 400 then progresses to step 420, at which the first set of combinations is altered to generate a second set of combinations on the basis of the number of time periods in which plants are to be introduced to the appliance 120. These particular time periods may be referred to as sowing days on which a user is to sow plants. The object of this step is to reduce the effort required by the user to grow plants by minimizing the number of sowing days.

The second set of combinations is selected such that function (2) below is minimized.

$$\Sigma_{d \in Days} sow_d \qquad (2)$$

In function (2) above, the parameter $sow_d$ has a value of 1 if the day d is a sowing day and 0 otherwise. Since one way to reduce the number of sowing days may be to reduce the expected yield, function (2) is minimized in order to obtain a "Pareto optimal" solution such that the expected yield obtained through the minimization of function (1) in step 410 is not reduced (the shortfall is not increased). To achieve this, the minimization of function (2) is performed with the constraint that shortfall calculated in step 410 is not affected. The result of the minimization of function (1) may be stored in a parameter $SHORTFALL_d$ which is held constant, and the minimization of function (2) may be performed such that the shortfall is less than or equal to the value stored in $SHORTFALL_d$. This constraint may be expressed by function (3) below.

$$\Sigma_{p \in Plants} shortfall_{p,d} \le SHORTFALL_d \,\forall d \in Days \qquad (3)$$

It may be considered that minimizing the shortfall in yield is a higher priority than reducing the number of sowing days, and therefore, the constraint expressed by function (3) may be a predefined constraint for step 420 of method 400. The result of step 420 specifies the days on which each plant is to be sown.

The method 400 subsequently progresses to step 430, at which step the second set of combinations is altered to generate a third set of combinations on the basis of the number of times plants are to be moved between plant growing zones. Given the expected yield and the sowing days determined in steps 410 and 420 respectively, the third set of combinations is selected such that each plant is allocated a plant growing zone so as to minimize the number of movements between zones. The third set of combinations is selected so as to minimize function (4) below given the expected yield and the sowing days determined in steps 410 and 420 respectively.

$$\Sigma_{p \in exPlants}\Sigma_{d \in Days}\Delta(z_{p,d}, z_{p,d-1}) \qquad (4)$$

In function (4) above p is a plant in the set $ex_{plants}$ which comprises all plants forming part of the total expected yield following steps 410 and 420, represents the zone assigned to plant p on day d, and the function $\Delta(z_{p,d}, z_{p,d-1})$ has a value of 1 if $z_{p,d} \ne z_{p,d-1}$ and 0 otherwise.

The third set of combinations determined at step 430 may be referred to as the determined set of combinations identified by the growth plan. In some examples, fewer or further steps may be performed to obtain the determined set of combinations for the growth plan. This determined set of combinations is the set of combinations including the first, second, third and fourth subsets of the plurality of plants and respective sets of environmental conditions identified by the growth plan mentioned previously.

In method 400, functions (1), (2) and (4) are minimized at respective separate steps of the method as explained above. The minimization of each of these functions may be performed as a single respective process, since each function is being minimized to achieve a single objective (for example, to minimize shortfall in yield). Minimizing functions (1), (2) and (4) at respective separate steps may alleviate the processing burden on, for example, a processor of the server 140 performing the function of the plan generation element 146 to minimize functions (1), (2) and (4), because it may be less computationally expensive to solve than a process in which the functions to be minimized are appended together. However, in some examples, the one or more of the functions may nonetheless be appended together and the minimization performed as a single process. For example, a function comprising function terms corresponding to one or more of the functions (1), (2) and (4) may be minimized in a single process as part of method 400.

Following the generation of the growth plan at step 440 according to the results obtained from the previous steps, the user may be presented with information indicating the growth plan via the user interface. As previously mentioned, if the user accepts the growth plan, the server 140 may proceed to step 340. At step 340, the communication apparatus 142 may transmit data according to the growth plan to the appliance 120, the transmitted data comprising instructions for the control apparatus 124 to control the plant growing zones of the appliance 120 according to the growth plan as described with reference to steps 350 and 360 above, and therefore control the appliance 120 to grow the plurality of plants desired by the user.

It should be appreciated that step 330 may encompass a growth plan generation method such as method 400, and that the considerations described above in relation to step 330 are taken into account when generating a plant growing plan.

The functions (1), (2) and (4) may be minimized using any suitable computational technique such as, for example, linear programming, integer programing, a Tabu search algorithm, a genetic algorithm or any other suitable technique. In some examples, if the user rejects the growth plan generated at step 330 using one of these computational techniques (i.e. the user does not accept the growth plan presented through the user interface), step 330 may be repeated by performing the growth plan generation method 400 again using a different one of these computational techniques to present an alternative growth plan to the user. In some examples, two or more of the computational techniques may be used in the growth plan generation method to present the user with a number growth plans as options for the user to select through the user interface.

In some examples, the user may select one or more of the above computational techniques to be used before the step 330 is performed. Once the user accepts a growth plan presented through the user interface, or selects one of a number of growth plans presented as options through the user interface, the method 300 may proceed to step 340.

During growth of plants in the appliance 120, the cameras 270 may capture image data of plants growing in the appliance 120, and the communication interface 126 of the appliance 120 may transmit the images to the server 140. After being received by the communication interface 142 of the server 140, the image processing element 150 may analyze the images in order to determine a condition of one or more of the plurality of plants growing in the appliance 120. The image processing element 150 may use any suitable image processing technique in order to determine a condition of a plant. For example, the image processing element 150 may detect changes in plant characteristics over time using methods such as counting percentage of image pixels in a plant image which are within certain colour parameters. Such methods may be used to determine a growth rate of a plant or to detect a harvesting event for example.

Statistical analysis may also be used in order to determine the differences between two images. For example, algorithms may be used to compare histograms of images. Examples of algorithms that may be used are "$\chi^2$ test" and "Earth Mover's Distance" algorithms. Images may also be analyzed using, for example, convolutional deep neural networks (CNNs) to identify certain characteristics in images A size of a plant, an amount of discoloration, an amount by which a plant has wilted or other aspects related to a plant that may indicate its condition may be identified using a suitable image processing technique for example.

The image processing element 150 may also analyze the images in order to determine whether the user has performed a task or not. The image processing element 150 may, for example, analyze the images to determine if the user has performed a task as indicated by the growth plan or has failed to do so. For example, the image processing element 150 may determine if a unit of a plant type has been harvested on a day a unit of that plant type was required according to the desired harvesting schedule. The image processing element 150 may also determine whether tasks not expected according to the growth plan have been performed, for example, the image processing element 150 may determine whether a plant has been harvested earlier than expected according to the growth plan.

Based on the image processing, the image processing element 150 may determine that a plant is in a "bad" condition, for example, the plant may be undersized compared to what might be expected according to the development phase that plant is expected to be in. The image processing element 150 may also determine that a plant is in a condition in which its development is more advanced than expected. Responsive to a determination that a given plant is in a bad condition or that its development is more advanced than expected, the plan generation element 146 may update the growth plan. For example, the updated growth plan may place the plant determined to be in a bad condition into a subset of the plurality of plant types to be provided a set of environmental conditions to encourage better growth of that plant. The plan generation element 146 may also update the growth plan based on whether the user has performed a task or not.

The task generation element 148 may generate tasks for the user of the appliance 120 to perform during growth of the plurality of plant types. For example, the task generation element 148 may provide appropriate prompts to the user through the task view of the user interface. For example, the task view may provide a prompt when a plant is to be moved from one plant growing zone to another, or any other task the user needs to perform in order to meet the total expected yield. The task generation element 148 may also send prompts to the user, for example, via email or SMS text message.

A specific example of a growth plan will now be described. In an example, a user may input data indicating that 1 unit of plant type A and 1 unit of plant type B are required on Saturday, and 1 unit of plant type C and 2 units of plant type D are required on Sunday. The appliance 120 owned by this user may comprise, for example, a first plant growing zone 122a and a second plant growing zone 122b only, with each plant growing zone having the capacity to accommodate 2 units of plant (may each comprise 2 grow sites only) of any of the requested plant types.

Figure 5A:
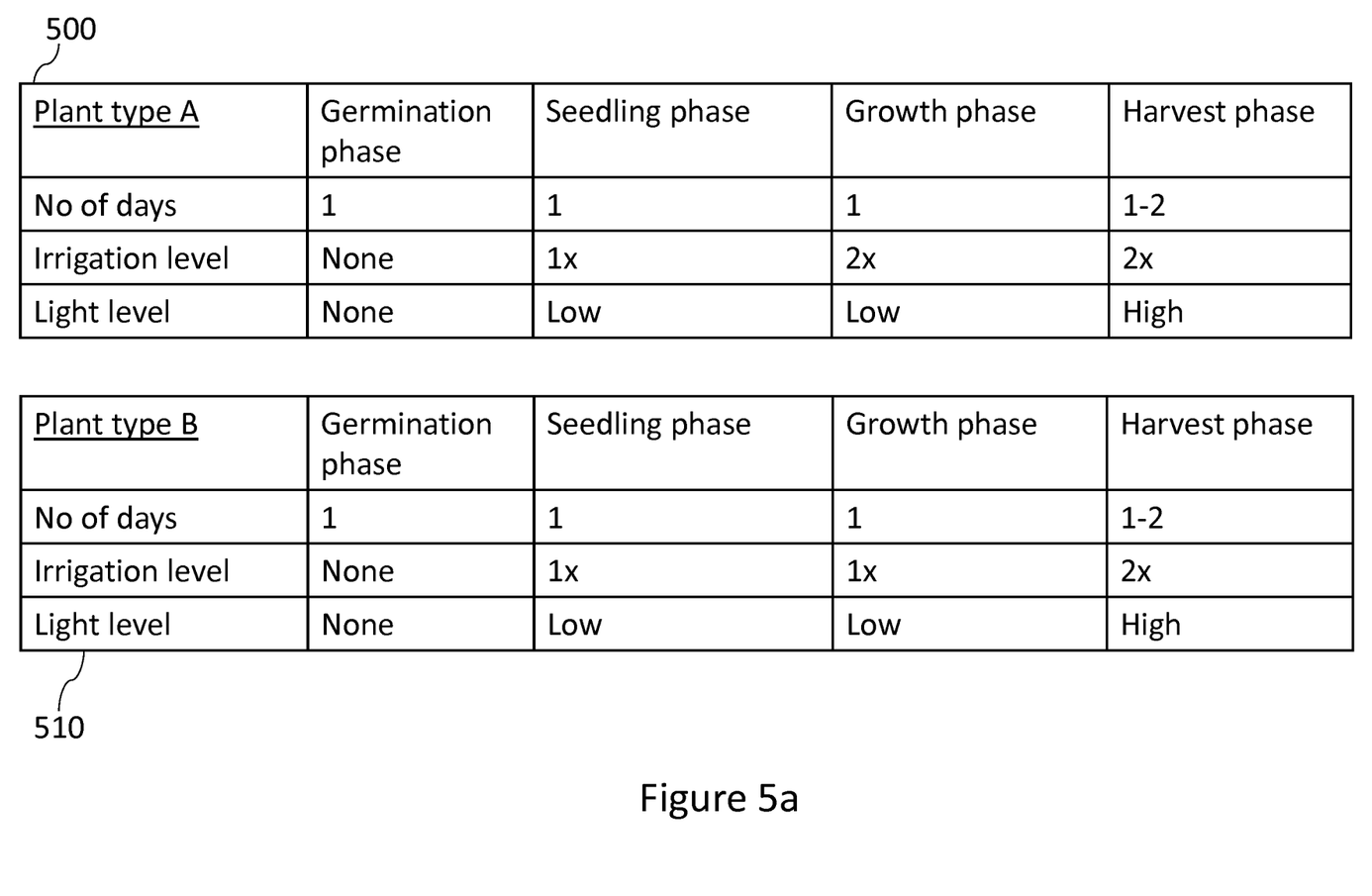
FIG. 5a shows a first and a second table indicating plant type characteristics.
Figure 5B:
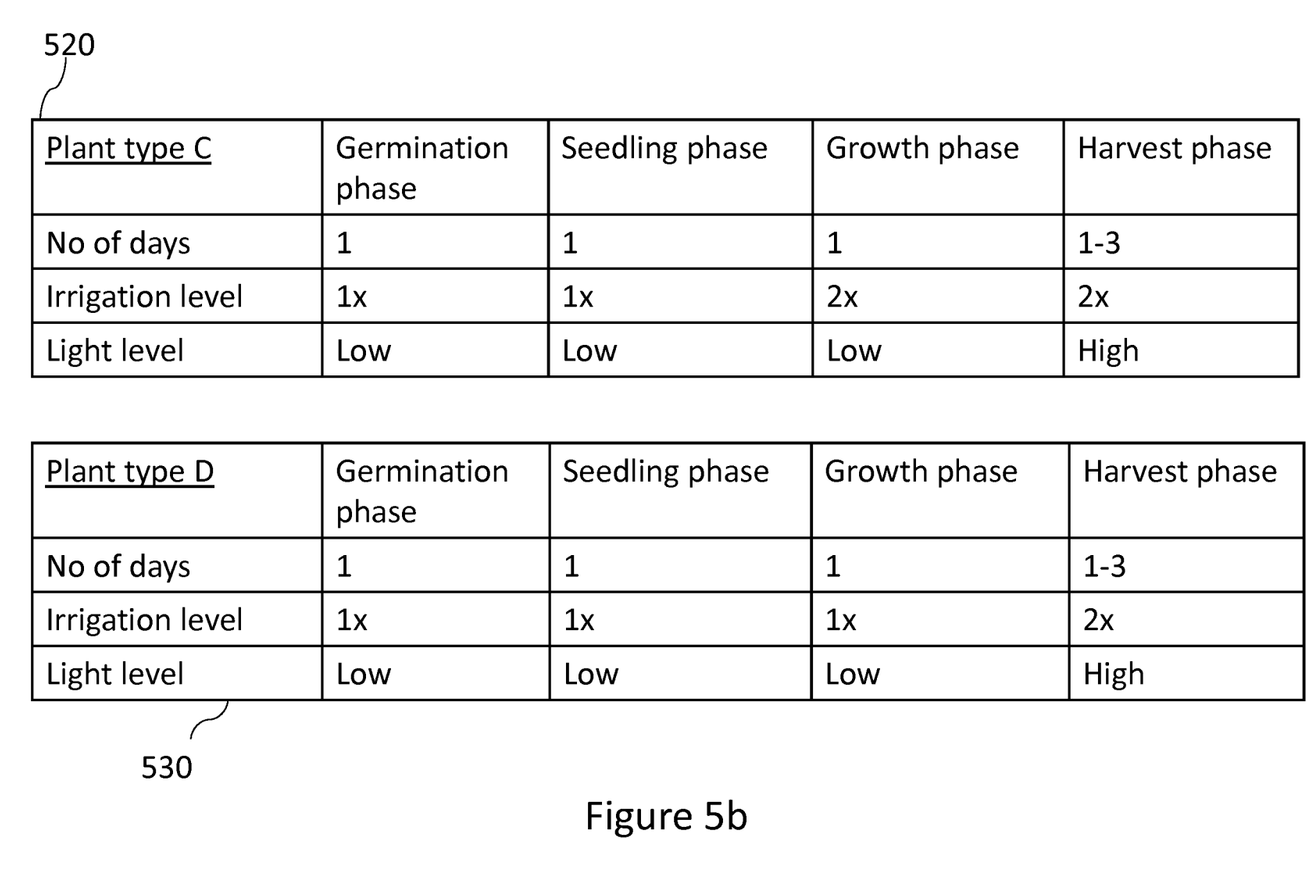
FIG. 5b shows a third and a fourth table indicating plant type characteristics.

Examples of environmental conditions that may be required by plant types A and B are shown in tables 500 and 510 respectively of FIG. 5a. Examples of environmental conditions that may be required by plant types C and D are shown in tables 520 and 530 respectively of FIG. 5b. In the tables of FIGS. 5a and 5b a number of days for each development phase, an irrigation level and a light level is shown for each plant type. The tables of FIGS. 5a and 5b represent data that may be stored in the database 144 and retrieved in step 320 of the method 300. More environmental characteristics than are shown in FIGS. 5a and 5b may be included in these table and retrieved from the database 144.

At step 410, the plan generation element 146 may determine an expected total yield with a shortfall of 1 with respect to the total desired yield since there is one less grow site available than there are plants required. The development phases of each type of plant apart from the harvesting phase last for a total of 3 days as indicated in tables 500, 510, 520 and 530. The first set of combinations selected at step 410 may indicate that one unit each of plant types A and B may be sown on Tuesday so as to be available for harvest on Saturday (day 2 of the 2 day harvesting phase) as specified by the desired harvesting schedule. The first set of combinations may also indicate that one unit each of plant types C and D may be sown on Wednesday so as to be available for harvest on Sunday (day 2 of the 3 day harvesting phase) as specified by the desired harvesting schedule.

Since the harvesting phase for plant types C and D can be extended to 3 days as shown in tables 520 and 530, at step 420, a second set of combinations may be selected which specifies that all plants are to be sown on Tuesday. Thus the number of sowing days may be reduced from 2 to 1 without that the expected yield (1 unit of plant of each type) is affected in a negative sense.

Figure 6:
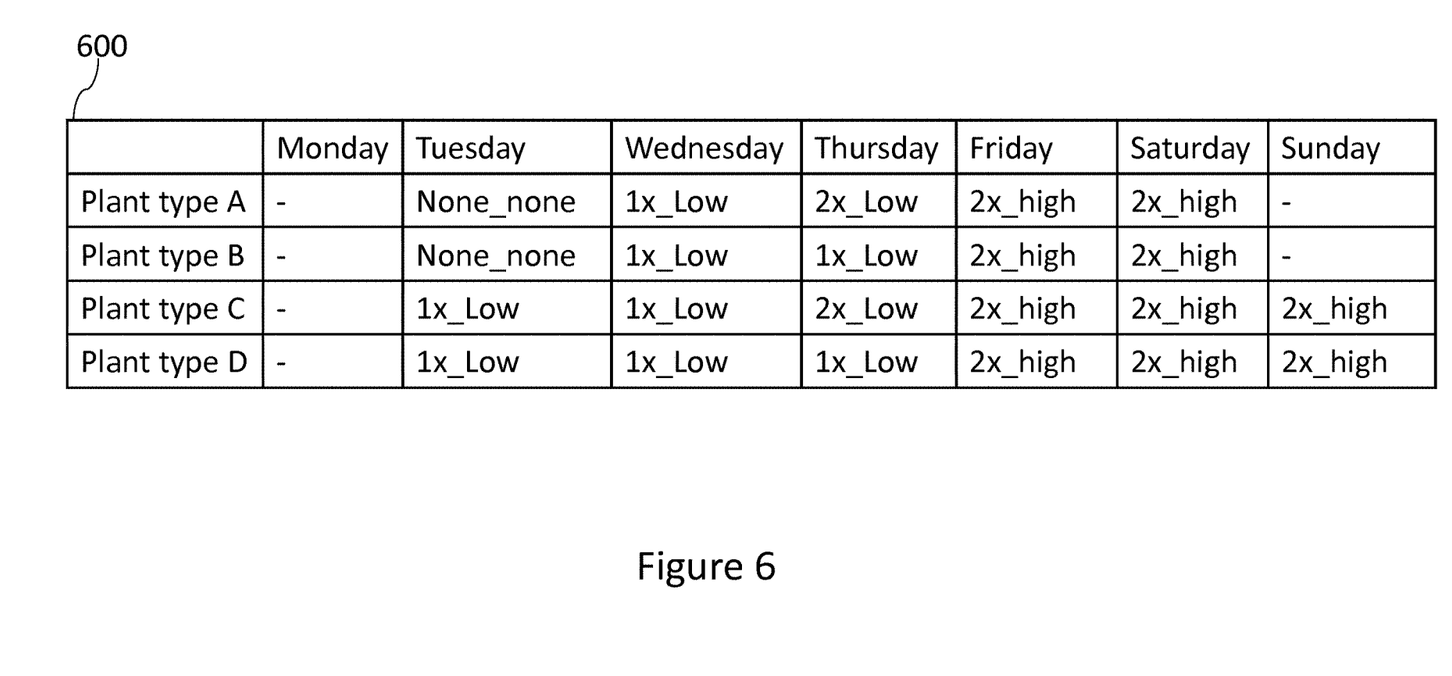
FIG. 6 shows a fifth table indicating environmental conditions required by plants for given periods of time.

The conditions that may be required by plant types A, B, C and D on each day are shown in table 600 of FIG. 6, and at step 430, a third set of combinations may be selected as follows. The entries in table 600, for example 1x_Low, indicate the required environmental conditions. For example, "1x" indicates the level of irrigation required and "Low" indicates the level of light required. It can be seen that plant types A and B require the same environmental conditions as each other on Tuesday and Wednesday and may therefore be placed together in the first plant growing zone 122a for first and second periods of time, the first period of time being Tuesday and the second period of time being Wednesday. The first plant growing zone 122a may be controlled according to the set of conditions "None_none" for the first time period and according to the set of conditions "1x_Low" for the second time period. Similarly, plant types C and D require the same environmental conditions as each other for the first and second time periods, and may be placed in the second plant growing zone 122b controlled according to the conditions "1x_Low" for both the first and second periods of time.

For Thursday (third time period), plant types A and B require different conditions from each other, as do plant types C and D. However, for the third time period, plant types A and C require the same conditions as each other, and plant types B and D require the same conditions as each other. Therefore, plant type B may be replaced by plant type C in the first plant growing zone 122a by the user, and the first plant growing zone 122a may be controlled according to the conditions "2x_Low" for the third time period. Plant type B may together be placed with plant type D in the second plant growing zone 122b by the user for the third time period, and the second plant growing zone may be controlled according to the conditions "1x_Low".

For all subsequent time periods, all plant types require the same environmental conditions and no further movements between zones are required. The user may harvest plant type A from the first zone 122a and plant type B from the second zone 122b on Saturday, and plant type C from the first zone 122a and plant type D from the second zone 122b on Sunday. This set of combinations involves two movements of plants between plant growing zones, namely the movement of plant type C from the second plant growing zone 122b to the first plant growing zone 122a and the movement of plant type B from the first plant growing zone 122a to the second plant growing zone 122b (both in the third time period). This is the minimum number of movements in this example, and therefore is an example of the determined set of combinations from method 400.

In the above examples, a small number of plant types, subsets of plant types, plant growing zones, etc. are mentioned for simplicity in describing the above methods. However, the plant growing apparatus 120 may, for example, accommodate a large number of units of plant. In one example, the apparatus 120 may include a total of 48 grow sites and may therefore accommodate 48 pots or punnets containing units of plant. It should be appreciated that even for a relatively small number of units of plant being grown in the apparatus 120 (e.g. smaller than a typical number of plants a user of the apparatus 120 may wish to grow), the number of possible sets of combinations is very large. For example, if groups of 4 pots or punnets containing units of plant are to be grown at a time, the possible ways of arranging the units of plant within the apparatus 120 may exceed a trillion (i.e. there may be over $10^{12}$ possible ways of arranging the units of plant within the apparatus 120). The ways of arranging the pots or punnets may be determined for all days over which the growth plan is to be implemented. In addition, the planning process may be repeated every day to account for changes in the desired yield, the condition of one or more of the units of plant, etc., for example. The above described computer implemented methods enable suitable arrangements to be efficiently determined.

In some examples, the plant growing system 100 may also provide additional functions. For example, an inventory service may be provided which monitors the inventory of a user and generates orders for consumables needed by the user. For example, if a user accepts a growth plan to grow plant types A and B, and the inventory of that user does not contain seeds of plant type B, an order may automatically be generated for seeds of plant type B to be sent to the user. The inventory of the user may be monitored for this purpose. For example, the appliance 120 may communicate inventory information to the server 140, the user may enter inventory information using the user interface or the like.

In some example, the plant growing system 100 may also provide a suggestion service for suggesting plant types to grow based on compatibility with an existing selection of plants being grown, previous selections, or popularity among other users.

It should be appreciated that one or more of the functions described as being performed by elements comprised in the server 140 may instead be performed by the appliance 120. For example, the appliance 120 may have a processor, or may make use of one or more of the microcontroller 220, to perform the method 400 to generate a growth plan. Although the plant growing system 100 is described as comprising the appliance 120 and the server 140, in some examples, the plant growing system 100 may not comprise a server 140 and all functions described above as being performed by the server 140 may instead be performed by the appliance 120.

It is to be understood that any feature described in relation to any one example may be used alone, or in combination with other features described, and may also be used in combination with any feature of any other of the examples, or any combination of any other of the examples. Furthermore, equivalents and modifications not described above may also be employed without departing from the scope of the accompanying claims.

The invention claimed is:

1. A plant growing system, comprising:
a plurality of plant growing zones;
a control apparatus configured to control one or more environmental conditions in each of the plurality of plant growing zones;
a database arranged to store data associating plant type characteristics with corresponding environmental characteristics for growing the respective plant type,
wherein the control apparatus is arranged to access the database to retrieve environmental characteristics corresponding to the plurality of plant types, and perform first and second determinations based on the retrieved environmental characteristics; and
a receiver configured to receive input data indicating plant type characteristics of a plurality of plant types to be grown in a plant growing apparatus,
wherein a plan generation element is arranged to generate a growth plan for growing, in the plant growing system, the plurality of plant types indicated by the input data;
wherein, based at least in part on the input data, the control apparatus is arranged to select first, second, third and fourth subsets from the plurality of plant types and to, by the plan generation element, generate the growth plan identifying a set of combinations of plants from the first, second, third and fourth subsets of plant types and corresponding environmental conditions for respective time periods, including the first, second, third and fourth subsets of plant types and first, second, third and fourth sets of environmental conditions therefor;
wherein, for generating the growth plan, the control apparatus is programmed to, perform the following prior to growing the plurality of plant types in a first time period:
perform the first determination to determine, for the first time period, (a) the first set of environmental conditions and plants suitable for those conditions from the first subset of the plurality of plant types in the growth plan, to determine subsequent placement of those plants in a first plant growing zone, and (b) a second set of environmental conditions and plants suitable for those conditions from the second subset of the plurality of plant types in the growth plan, to determine subsequent placement of those plants in a second plant growing zone . . . perform the second determination to determine, for a second time period, (c) a third set of environmental conditions and plants suitable for those conditions from the third subset of the plurality of plant types in the growth plan, to determine subsequent placement of those plants in the first plant growing zone, and (d) a fourth set of environmental conditions and plants suitable for those conditions from the fourth subset of the plurality of plant types in the growth plan, to determine subsequent placement of those plants in the second plant growing zone; and wherein the control apparatus is programmed to in use, when growing the plurality of plant types:
control the first plant growing zone of the plurality of plant growing zones according to the first set of environmental conditions during the first time period;
control the second plant growing zone of the plurality of plant growing zones according to the second set of environmental conditions during the first time period;
control the first plant growing zone according to the third set of environmental conditions during the second time period; and
control the second plant growing zone according to the fourth set of environmental conditions during the second time period.

2. The plant growing system according to claim 1, wherein at least one of the first determination and the second determination is performed by the control apparatus performed using one or more of; linear programming, integer programming, a Tabu search algorithm and/or a genetic algorithm.

3. The plant growing system of claim 1, wherein a number of the plant growing zones are provided in the plant growing apparatus,
wherein the plant growing apparatus includes the control apparatus,
wherein the plant growing apparatus comprises a communication interface configured to receive data indicating instructions to be carried out by the control apparatus, wherein the instructions specify;
for the first time period, the first and second set of environmental conditions and the plants suitable for those conditions from the respective first and second subsets of the plurality of plants, to instruct subsequent placement of those plants respectively in the first and second plant growing zones; and
for the second time period, the third and fourth sets of environmental conditions and the plants suitable for those conditions from the respective third and fourth subsets of the plurality of plants, to instruct subsequent placement of those plants respectively in the first and second plant growing zones.

4. The plant growing system according to claim 1 wherein, for growing different given plant types A and B of the plurality of plant types, the set of combinations in the growth plan requires that both different plant types A and B are provided under the same set of environmental conditions in the same plant growing zone for a period of time at respective given or different development phases.

5. The plant growing system according to claim 1, wherein at least one of the plurality of plant growing zones comprises, or multiple of the plurality of plant growing zones each comprises, one or more grow sites at which individual units of plants can be grown; and wherein the control apparatus includes one or more regulators, the one or more regulators being configured to regulate environmental conditions within each of the plant growing zones independently.

6. The plant growing system according to claim 1, wherein the one or more environmental conditions comprise an electromagnetic radiation characteristic, a carbon dioxide level, a humidity level, a temperature, an amount of airflow, a moisture level of a plant growth medium, a pH of a growth medium, a nutrient level of a plant growth medium and a size of one of the plurality of plant growing zones.

7. The plant growing system according to claim 6, wherein the control apparatus comprises one or more environmental condition sensors configured to detect the one or more environmental conditions in the plurality of plant growing zones.

8. The plant growing system according to claim 1, wherein the set of combinations is based on one or more characteristics used to generate the growth plan, the one or more characteristics relating to at least one of an expected yield of the plurality of plant types, a number of time periods in which plants are to be introduced to the plant growing apparatus, and a number of times plants are to be moved between the plurality of plant growing zones.

9. The plant growing system according to claim 8, wherein one of:
i) the set of combinations is based on a sequential process wherein:
a first set of combinations is based on a first one of the one or more characteristics; the first set of combinations altered to generate a second set of combinations which is based on a second one of the one or more characteristics and a predefined constraint relating to the first one of the one or more characteristics; or
ii) the set of combinations is based on:
a first set of combinations based on the expected yield of the plurality of plant types and a first function indicating a total shortfall in a total expected yield with respect to a total desired yield to determine the total expected yield, wherein a first value of the first function is minimized,
the first set of combinations altered to generate a second set of combinations based on the number of time periods in which plants are to be introduced to the plant growing apparatus and a second function indicating the number of time periods, with a predefined constraint relating to the total expected yield, to determine the respective time periods in which each plant is to be introduced to the plant growing apparatus wherein a second value of the second function is minimized.

10. The plant growing system according to claim 9, wherein one of:
the first function is: $\Sigma_{p \in Plants} w_p \Sigma_{d \in Days} Shortfall_{pd}$, wherein p is a plant belonging to the set Plants which comprises all plants of all plant types indicated by the input data, d is a day belonging to the set Days which comprises all days over which the growth plan is to be implemented, the parameter $w_p$ represents the relative importance value of the plant p, and $Shortfall_{pd}$ represents a shortfall of an expected yield of plant p on day d with respect to a desired yield of that plant on that day; and the second function is $\Sigma_{d \in Days} sow_d$, wherein the parameter $sow_d$ has a value of 1 if the day d is a day corresponding to a time period in which plants are to be introduced to the plant growing system and 0 otherwise; or
the second set of combinations altered to generate a third set of combinations based on the number of times plants are to be moved between plant growing zones and a third function indicating the number of times plants are to be moved between plant growing zones based on the total expected yield and the time periods, wherein a value of the third function is minimized.

11. The plant growing system according to claim 10, wherein the third function is $\Sigma_{p \in ex_{Plants}} \Sigma_{d \in Days} \Delta(z_{p,d}, z_{p,d-1})$, wherein p is a plant in the set $ex_{Plants}$ which comprises all plants forming part of the total expected yield, $Z_{p,d}$ represents the plant growing zone assigned to plant p on day d, and the function $\Delta(z_{p,d}, z_{p,d-1})$ has a value of 1 if $z_{p,d} \neq z_{p,d-1}$ and 0 otherwise.

12. The plant growing system according to claim 9, wherein one or more of the respective functions is minimized using linear programming, integer programming, a Tabu search algorithm and/or a genetic algorithm.

13. The plant growing system according to claim 8, wherein the set of combinations is based on a function comprising a first and a second function term appended together, wherein the value of the function is minimized, wherein:
the first function term indicates a total shortfall in a total expected yield with respect to another total yield; and
the second function term indicates the number of time periods in which plants are to be introduced to the plant growing apparatus.

14. The plant growing system according to claim 13, wherein a third function term is appended to the first and second function terms, wherein the third function term indicates the number of times plants are to be moved between the plurality of plant growing zones.

15. The plant growing system according to claim 8, comprising one or more cameras, wherein the control apparatus is programmed to perform image processing on image data received from the one or more cameras to determine a condition of one or more of the plurality of plants, and to update the growth plan on the basis of the determined condition.

16. A method to control a plant growing apparatus configured to grow a plurality of plant types, the plant growing apparatus comprising a plurality of plant growing zones, a receiver and a control apparatus, the method comprising:
by the receiver, receiving input data indicating characteristics of a plurality of plant types to be grown in the plant growing apparatus, via a database arranged to store data associating plant type characteristics with corresponding environmental characteristics for growing the respective plant type, wherein the control apparatus is arranged to access the database to retrieve environmental characteristics corresponding to a plurality of plant types and perform first and second determinations on the basis of the retrieved environmental characteristics;
based at least in part on the input data, the control apparatus selects first, second, third and fourth subsets from the plurality of plant types and generates, by a plan generation element for growing the plurality of plant types indicated by the input data in the plant growing apparatus, a growth plan identifying a set of combinations of plants from the subsets of plant types and corresponding environmental conditions for respective time periods, including the first, second, third and fourth subsets of plant types and first, second, third and fourth sets of environmental conditions;
for generating the growth plan, determining the following by the control apparatus prior to growing the plurality of plant types in the first time period:
for a first time period; the first set of environmental conditions and plants suitable for those conditions from the first subset of the plurality of plant types, to in the growth plan determine subsequent for placement of those plants in a first plant growing zone, and a second set of environmental conditions and plants suitable for those conditions from a second subset of the plurality of plant types, for placement of those plants in a second plant growing zone; and
for a first time period the first set of environmental conditions and plants suitable for those conditions from the first subset of the plurality of plant types in the growth plan, to determine subsequent placement of those plants in a first plant growing zone, and a second set of environmental conditions and plants suitable for those conditions from a second subset of the plurality of plant types, for placement of those plants in a second plant growing zone; and for a second time period: the third set of environmental conditions and plants suitable for those conditions from the third subset of the plurality of plant types in the growth plan, to determine subsequent placement of those plants in the first plant growing zone, and the fourth set of environmental conditions and plants suitable for those conditions from the fourth subset of the plurality of plant types in the growth plan, to determine subsequent placement of those plants in the second plant growing zone; by the control apparatus, controlling the first plant growing zone of the plurality of plant growing zones according to the first set of environmental conditions during the first time period; by the control apparatus, controlling the second plant growing zone of the plurality of plant growing zones according to the second set of environmental conditions during the first time period
by the control apparatus, controlling the first plant growing zone according to the third set of environmental conditions during the second time period; and
by the control apparatus, controlling the second plant growing zone according to the fourth set of environmental conditions during the second time period.

17. The method according to claim 16, further comprising a computer program for a control apparatus of a plant growing system, the computer program including computer-readable instructions executable to perform said method comprising:
by the computer program, receiving input data indicating characteristics of a plurality of plant types to be grown in the plant growing apparatus, via the database;
by the computer program, generating the growth plan via the plan generation element, the growth plan indicating, for said first time period, said first set and said second set of environmental conditions and plants suitable for those conditions from respective first and second subsets of the plurality of plant types in the growth plan, to indicate the subsequent placement of those plants respectively in first and second plant growing zones, and for said second time period, said third set and said fourth set of environmental conditions and plants suitable for those conditions from respective third and fourth subsets of the plurality of plant types in the growth plan, to indicate the subsequent placement of those plants in the first and second plant growing zones; and
the computer program transmitting data according to the growth plan to the plant growing apparatus, the transmitted data comprising instructions for the control apparatus to in use:
control said first plant growing zone of the plurality plant growing zones according to the first set of environmental conditions during the first time period;

control said second plant growing zone of the plurality of plant growing zones according to the second set of environmental conditions during the first time period;

control the first plant growing zone of the plurality plant growing zones according to the third set of environmental conditions during the second time period; and control the second plant growing zone of the plurality of plant growing zones according to the fourth set of environmental conditions during the second time period.

18. The method according to claim 16 wherein, for growing different given plant types A and B of the plurality of plant types, the set of combinations in the growth plan requires that both different plant types A and B are provided under the same set of environmental conditions in the same plant growing zone for a period of time at respective given or different development phases.

19. The method according to claim 16, wherein the growth plan is generated by a computer program, and further comprising selecting the set of combinations based on a sequential process comprising multiple steps, including:

by the computer program, performing a first step of selecting a first set of combinations on the basis of an expected yield of the plurality of plant types by minimizing a value of a first function indicating a total shortfall in a total expected yield with respect to a total desired yield to determine the total expected yield;

by the computer program, performing a second step of altering the first set of combinations to generate a second set of combinations on the basis of a number of time periods in which plants are to be introduced to the apparatus by minimizing a value of a second function indicating the number of time periods, with a predefined constraint relating to the total expected yield, to determine the respective time periods in which each plant is to be introduced to the apparatus.

20. The method according to claim 19, further comprising performing, by the computer program, a third step of altering the second set of combinations to generate a third set of combinations on the basis of a number of times plants are to be moved between plant growing zones by minimizing a value of a third function indicating the number of times plants are to be moved between plant growing zones based on the total expected yield from the first step and the time periods from the second step.

\* \* \* \* \*